Sept. 21, 1926.
A. D'ARINO
1,600,579
PROCESS FOR ORNAMENTING TRANSPARENT MATERIALS
Filed June 11, 1925
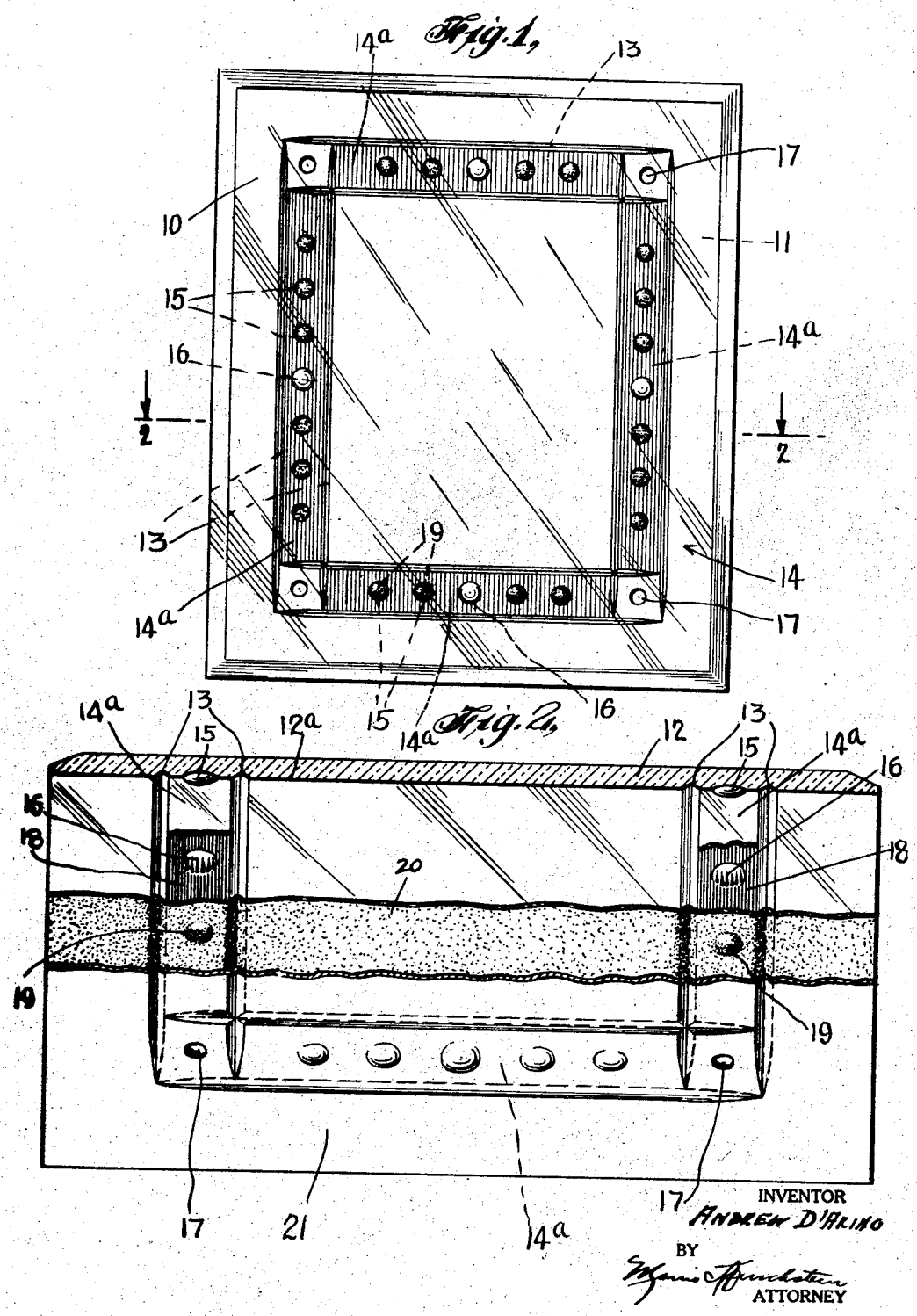
INVENTOR
ANDREW D'ARINO
BY
ATTORNEY Patented Sept. 21, 1926.

1,600,579

UNITED STATES PATENT OFFICE.

ANDREW D'ARINO, OF NEW YORK, N. Y.

PROCESS FOR ORNAMENTING TRANSPARENT MATERIALS.

Application filed June 11, 1925. Serial No. 36,333.

This invention relates to processes for ornamenting or decorating transparent materials.

An object of the invention is to provide an improved and simplified process for ornamenting or decorating transparent sheet material having a silvered backing, such as used for mirrors, windows, plaques, decorative household tableware and the like articles.

Another object of the invention is to provide an improved and simplified means whereby a transparent material may have a highly decorative facing applied to one side thereof, said facing comprising highly reflecting, refracting, and colored portions, adapted to be combined to form an ornamental article of the character described.

A further object of the invention is the provision of an improved process of the character described which is simple, easy, quick and inexpensive to apply, and practical and efficient to a high degree for the purposes described.

Other objects of this invention will in part be obvious and in part hereinafter pointed out.

The invention accordingly consists in the features of construction, combinations of elements and arrangement of parts which will be exemplified in the construction hereinafter described, and of which the scope of application will be indicated in the following claim.

In the accompanying drawing, in which is shown one of the various possible illustrative embodiments of this invention, Fig. 1 is a front view of a mirror having an ornamental facing applied to one side thereof embodying the invention; and Fig. 2 is a perspective sectional view taken on line 2—2 showing portions of the facing broken away to show the process of applying same.

Referring in detail to the drawing, 10 denotes a mirror, the rear side of which has an ornamental facing 11 made by the process embodying the invention. Said mirror 10 is seen to comprise a sheet of glass 12 or other translucent or transparent material and said facing 11, the latter including grooves formed in the rear surface $12^a$ of said glass. Said grooves 13 may be arranged to form a desired artistic design 14 which may also include other ornamental elements 15 and 16 depressed into the rear surface $12^a$. The design formed with the grooves 13 and ornamental elements 15 and 16 may be impressed into the rear surface $12^a$ by molding, cutting, etching or in any other suitable manner well known in the art.

Where the mirror 10 is adapted to be mounted unframed, holes 17 may be provided for receiving suitable means (not shown) for fastening the mirror to a wall or other support.

After providing the glass 12 with the desired design 14 depressed in the rear surface $12^a$ thereof, the surface portion $14^a$ of said design between adjoining grooves 13 are then artistically painted or enameled with a plain, colored or figured background, coating, or layer 18 which may be translucent or preferably opaque to light. The design elements 15 and 16 are then either covered with a coating or layer 19 of like or contrasting color having similar properties to the coating 18 or may be left uncovered as desired. In the drawing, elements 15 are shown provided with a coating 19 and the elements 16 are left uncovered. All the uncovered or clear portions of the rear surface $12^a$ are then carefully cleansed and a layer having a highly reflecting, image-forming, mirror surface 20, such as a silver film or a material of like property, is applied thereto in the well known manner. To protect said layers forming the facing 11 against accidental damage a suitable protective coating 21 of paint or varnish is then applied thereon.

Thus, by means of the simplified and easy process described requiring a minimum amount of time and labor, the transparent sheet of glass 10 or the like material may be decorated to form an ornamental mirror, panel, plaque or other article.

Having thus described my invention, I claim as new and desire to secure by Letters Patent:—

A process of the character described consisting in forming a design by depressing ornamental elements on one surface of a transparent material, grooving said surface to completely surround said elements, coating portions of the undepressed surface between said grooves with an opaque decorative background layer, applying an image reflecting layer to clear portions of said surface, and coating said layers with paint to form a rear protecting surface on said material for preventing accidental damage to said layers.

In testimony whereof I affix my signature.

ANDREW D'ARINO.